United States Patent Office 3,770,649
Patented Nov. 6, 1973

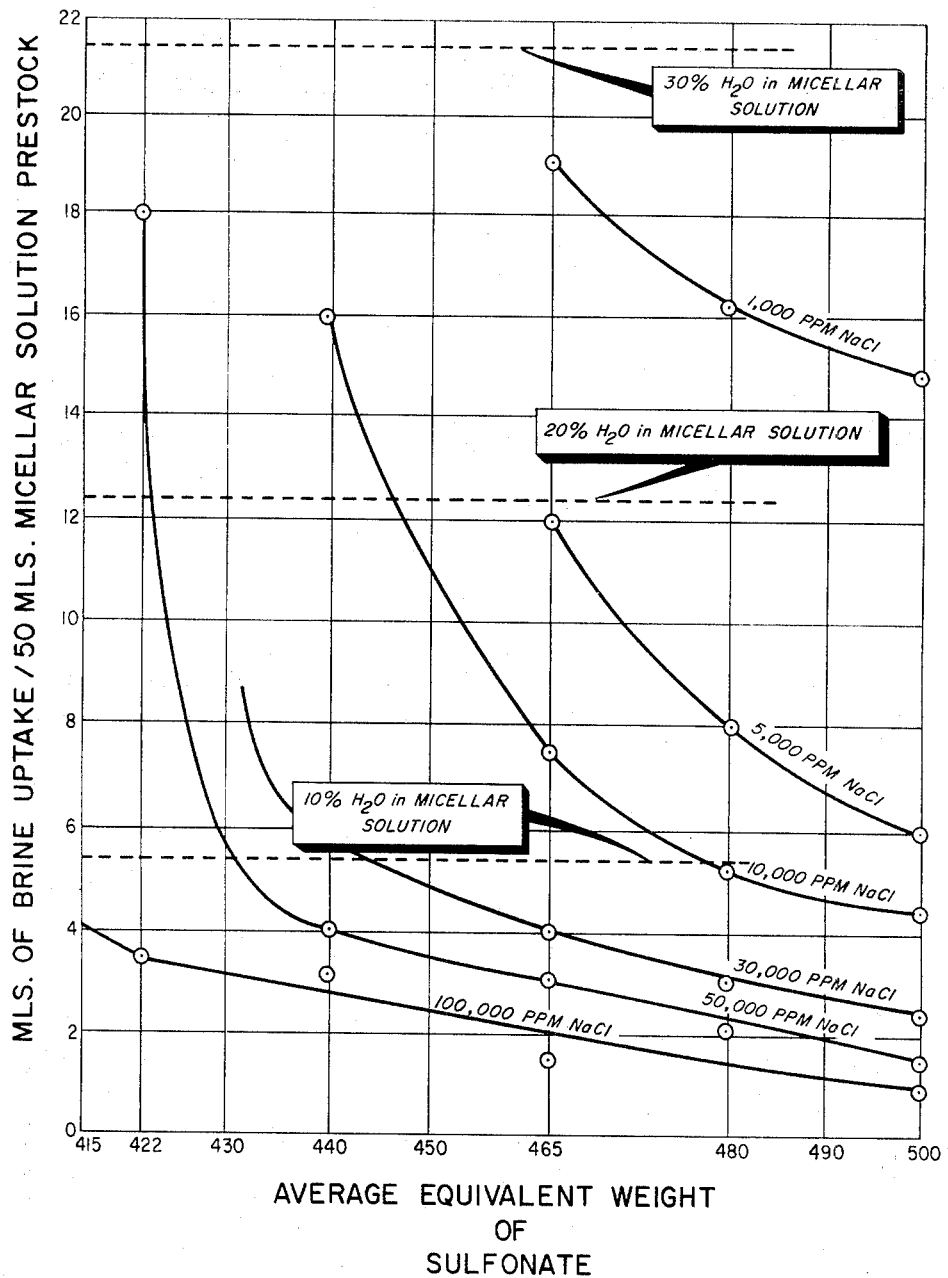

3,770,649
FLOODING WITH MISCIBLE-TYPE FLUID SLUGS HAVING DIFFERENT BRINE TOLERANCES
David N. Burdge, Denver, Colo., assignor to Marathon Oil Company, Findlay, Ohio
Continuation-in-part of abandoned application Ser. No. 665,078, Sept. 1, 1967, and a division of application Ser. No. 19,573, Mar. 16, 1970, now Patent No. 3,623,553, dated Nov. 30, 1971. This application July 9, 1971, Ser. No. 161,315
Int. Cl. B01j 13/00
U.S. Cl. 252—312
7 Claims

ABSTRACT OF THE DISCLOSURE

Micellar dispersions useful in flooding subterranean formations and desirably having a particular brine tolerance permitted by the components within the micellar dispersion are obtained by utilizing low average equivalent weight surfactants to obtain a high brine tolerance and increasing average equivalent weight surfactant to obtain lower brine tolerances. These dispersions are injected and displaced through the formation to give improved oil recoveries.

CROSS REFERENCE TO RELATED APPLICATIONS

This is a continuation-in-part of my copending U.S. patent application, Ser. No. 665,078, filed Sept. 1, 1967, now abandoned; and a divisional of Ser. No. 19,573, filed Mar. 16, 1970, now U.S. Pat. No. 3,623,553, issued Nov. 30, 1971.

BACKGROUND OF THE INVENTION

Field of the invention

This invention relates to injecting a flooding agent into and displacing it through a subterranean formation to recover crude oil therefrom. Micellar dispersions are the flooding agent and are designed to have a brine tolerance compatible with the formation fluids.

Description of the prior art

Micellar solutions are useful to improve the recovery of crude petroleum from subterranean formations. This is especially true in secondary-type processes (especially tertiary recovery) wherein the micellar solution is moved through a formation to displace residual oil towards a production well. Recovery of up to about 100% of the oil in place can be realized from such a process. Examples of such systems are defined in U.S. Pat. Nos. 3,275,075, 3,261,399, and 3,254,714.

It is known that small amounts of salt tend to enhance the stability of emulsions but that large amounts of salt are known to break both water-external and oil-external emulsion systems. Some formation waters contain a high ionic concentration, i.e. high salt content, and on contact with the micellar solution the stability of the latter can be affected adversely, thus impairing the operational characteristics.

Applicant has discovered a method of increasing the brine tolerance of a micellar solution by decreasing the average equivalent weight of the surfactant (e.g. by blending) utilized within the solution. By this method, a micellar solution can be "tailored" to circumvent adversities experienced with formation water containing different amounts of ions. As used herein, "brine tolerance" is defined as the maximum concentration of ions in an aqueous solution which will be dispersed by the micellar solution without the micellar solution becoming unstable. The ions in solution are the disassociation products of acids, bases and/or salts—such can be monovalent, polyvalent, etc. Usually, the ions are derived from water soluble salts, for example NaCl. For ease of discussion, the terms brine and brine tolerance are used interchangeably.

DESCRIPTION OF THE DRAWING

The figure represents the relationship of the average equivalent weight of sulfonates in a micellar solution prestock vs. mls. (milliliters) of brine uptake per 50 mls. of the prestock. The brine contains the indicated amounts of NaCl. The indicated average equivalent weights are obtained by a weight ratio of Petronate CR (average equivalent weight=500) and Petronate L (average equivalent weight=422). The micellar solution prestock is obtained by mixing 85% of stabilized light straight-run gasoline and 15% of the sulfonate. As is readily ascertainable from this figure, a lower equivalent weight sulfonate yields higher brine tolerances.

DESCRIPTION OF THE INVENTION

The term micellar solution as used herein is meant to include "microemulsions" [Schulman and Montagne, Annals of the New York Academy of Sciences, 92, pages 366–371 (1961)], oleopathic hydro-micelles [Hoar and Schulman, Nature, 152, page 102 (1943)], "transparent" emulsions (Blair, Jr., et al., U.S. Pat. No. 2,356,205) and micellar solutions defined in U.S. Pat. Nos. 3,254,714; 3,275,075; 3,301,325, 3,307,628, and 3,497,006. The equilibrium of the micellar solution tends toward further dispersion of the internal phase rather than coalescence of this phase.

The micellar solution is composed essentially of hydrocarbon, aqueous medium such as water, and surfactant sufficient to impart micellar solution characteristics to the mixture. Examples of hydrocarbon include crude oil, crude column overheads, straight-run gasoline such as lower hydrocarbon fractions equal to or greater than at least pentane, liquefied petroleum gases, etc. Useful surfactants include alkyl aryl sulfonates, more commonly known as petroleum sulfonates or as alkyl aryl naphthenic sulfonates. Examples of useful petroleum sulfonates containing a monovalent cation can be identified by the empirical formula $C_nH_{2n-10}SO_3M$ wherein $n$ is an integer from about 20 to about 30 and M can be sodium, potassium, ammonium, etc. The sulfonates can have an average equivalent weight within the range of about 350 to about 525. Equivalent weight is defined as the molecular weight divided by the number of sulfonate groups, thus the equivalent weight is equal to the molecular weight for a given monosulfonate.

In addition, the micellar solution can contain a semipolar organic compound such as a ketone, ester, amide, and alcohol containing one to about 20 or more carbon atoms. Preferably, the semi-polar compound is an alcohol, e.g. isopropanol, n- and isobutanol, the amyl alcohols, 1- and 2-hexanol, 1- and 2-octanol, p-nonyl phenol, 2-butoxyethanol, and like materials.

Electrolytes such as inorganic bases, inorganic acids, inorganic salts, organic bases, organic acids, and organic salts can be incorporated into the micellar solution. Examples of useful electrolytes are found in U.S. Pat. Nos. 3,297,084 and 3,330,343. Preferably, the electrolytes are inorganic acids, inorganic bases, and inorganic salts. Examples of preferable electrolytes include sodium sulfate, sodium chloride, sodium hydroxide, hydrochloric acid, sulfuric acid, and sodium nitrate.

Preferably, the micellar solutions consist of five components, i.e. hydrocarbon, aqueous medium, surfactant, electrolyte, and semi-polar organic compound.

It is desirable in the flooding of a subterranean formation to maintain substantially the stability of much of the micellar solution, at least during the initial flooding stages. Formation waters, however, sometimes contain a high salt concentration and tend to adversely affect the stability of the micellar solution. As a result, the operational efficiency of the recovery process can be reduced. Since the ion concentration and type may vary considerably from one formation to the next, it is desirable to "tailor" the micellar solution to permit sorption of the ions without impairing the operational characteristics of the recovery process.

It has been discovered that the average equivalent weight of the petroleum sulfonate has a large influence on the brine tolerance of the micellar solution. This relationship is an inverse one, i.e. a high equivalent weight sulfonate (e.g. 520) reduces the brine tolerance while a lower equivalent weight sulfonate (e.g. 360) increases the brine tolerance. In addition, it has been discovered that the brine tolerance of a high equivalent weight can be improved by blending with it a lower equivalent weight sulfonate, e.g. a sulfonate of 500 can be blended with a sulfonate of 450 equivalent weight to obtain a brine tolerance equivalent to a sulfonate having an equivalent weight of about 475. Therefore, the equivalent weight brine tolerance relationship is additive.

By following the teachings of this invention, micellar solutions can be "tailored" to a particular subterranean formation. This can be accomplished by analyzing the ion content of the formation water and designing the micellar solution to contain a particular average equivalent weight sulfonate. However, it is to be understood that the permeability of the formation, the viscosity of the crude petroleum within the formation, the type of drive material to displace the micellar solution, the operational characteristics to be employed within the process, etc., also influence the design of the micellar solution.

The following examples are submitted to specifically illustrate working embodiments of the invention. It is not intended that the components of the micellar solution, the amounts of the components within the micellar solution, etc., limit the invention. Rather, it is intended that all equivalents obvious to those skilled in the art be included within the scope of the invention as described within the specification and appended claims. The percents are based on volume unless otherwise specified.

EXAMPLE 1

Ten milliliter (ml.) samples of micellar solution prestock containing stabilized light straight-run gasoline, 8.7% of an active sulfonate indicated in Table I, and Table I indicated percents of isopropanol are titrated while being stirred with Table I indicated concentrations of brine ($Na_2SO_4$ in distilled water) until the solutions indicate a turbid condition, i.e. unstable. The amount of brine uptake in the micellar solutions and amount of salt incorporated into the micellar solutions are indicated in Table I.

TABLE I

| | Micellar solution composition surfactant | | | Brine tolerance | | |
|---|---|---|---|---|---|---|
| Sample No. | Type | Average equivalent weight | Percent isopropanol | Concentration of $Na_2SO_4$ in brine, percent by weight | Brine uptake (ml.) | Percent $Na_2SO_4$ in micellar solution by weight |
| 1a | L-70 | 420/440 | 5 | 0.5 | 4.33 | 0.18 |
| 1b | M-70 | 450/470 | 5 | 0.5 | 2.02 | 0.10 |
| 1c | H-70 | 490/510 | 5 | 0.5 | 0.61 | 0.04 |
| 2a | L-70 | 420/440 | 5 | 1.0 | 1.90 | 0.20 |
| 2b | M-70 | 450/470 | 5 | 1.0 | 0.90 | 0.10 |
| 2c | H-70 | 490/510 | 5 | 1.0 | 0.51 | 0.06 |
| 3a | L-70 | 420/440 | 5 | 2.0 | 0.82 | 0.19 |
| 3b | M-70 | 450/470 | 5 | 2.0 | 0.68 | 0.16 |
| 3c | H-70 | 490/510 | 5 | 2.0 | 0.40 | 0.10 |
| 4a | L-70 | 420/440 | 3 | 0.5 | 5.55 | 0.21 |
| 4b | M-70 | 450/470 | 3 | 0.5 | 1.59 | 0.09 |
| 4c | H-70 | 490/510 | 3 | 0.5 | 0.65 | 0.04 |
| 5a | L-70 | 420/440 | 3 | 2.0 | 1.06 | 0.24 |
| 5b | M-70 | 450/470 | 3 | 2.0 | 0.73 | 0.17 |
| 5c | H-70 | 490/510 | 3 | 2.0 | 0.48 | 0.11 |
| 6a | L-70 | 420/440 | 3 | 8.0 | 0.48 | 0.47 |
| 6b | M-70 | 450/470 | 3 | 8.0 | 0.42 | 0.41 |
| 6c | H-70 | 490/510 | 3 | 8.0 | 0.36 | 0.36 |
| 7a | L | 415/430 | 5 | 0.5 | 5.57 | 0.21 |
| 7b | HL | 440/470 | 5 | 0.5 | 1.06 | 0.06 |
| 7c | CR | 490/510 | 5 | 0.5 | 0.55 | 0.03 |
| 8a | L | 415/430 | 5 | 1.0 | 1.76 | 0.19 |
| 8b | HL | 440/470 | 5 | 1.0 | 0.76 | 0.09 |
| 8c | CR | 490/510 | 5 | 0.5 | 0.55 | 0.03 |
| 9a | L | 415/430 | 5 | 2.0 | 0.82 | 0.19 |
| 9b | HL | 440/470 | 5 | 2.0 | 0.60 | 0.14 |
| 9c | CR | 450/510 | 5 | 2.0 | 0.40 | 0.10 |
| 10a | L | 415/430 | 5 | 8.0 | 0.41 | 0.40 |
| 10b | HL | 440/470 | 5 | 8.0 | 0.33 | 0.33 |
| 10c | CR | 490/510 | 5 | 8.0 | 0.25 | 0.25 |
| 11a | L-70 $NH_4^{+*}$ | 425 | 5 | 1.0 | 1.03 | 0.12 |
| 11b | M-70 $NH_4^{+*}$ | 455 | 5 | 1.0 | 0.75 | 0.09 |
| 11c | H-70 $NH_4^{+*}$ | 495 | 5 | 1.0 | 0.36 | 0.04 |

*An ammonium sulfonate similar to the above indicated. Morco sulfonates except the $Na^+$ ion is exchanged for $NH_4^+$ ion.

NOTE.—Legend to Table I:
L-70, Morco L-70 (a sodium alkyl naphthenic sulfonate marketed by Mineral Oil Refining Co., Dickinson, Texas), active sulfonate=70%, mineral oil=23-25%, water=4-6%, and salt impurities up to 0.5%.
M-70, Morco M-70 (a sodium alkyl aryl naphthenic sulfonate marketed by Mineral Oil Refining Co., Dickinson, Texas), active sulfonate=70%, mineral oil=23-25%, water=4-6%, and salt impurities up to 0.5%.
H-70, Morco H-70 (a sodium alkyl aryl naphthenic sulfonate marketed by Mineral Oil Refining Co., Dickinson, Texas), active sulfonate=70%, mineral oil=23-25%, water=4-6%, and salt impurities up to 0.5%.
L=Petronate L (a sodium alkyl aryl naphthenic sulfonate marketed by Sonneborn Chemical & Refining Co., 300 Park Avenue South, New York 10010, N.Y.), active sulfonate=62.0%, mieral oil=33.0%, water=4.5% and salt impurities=0.5%.
HL=Petronate HL (a sodium alkyl aryl naphthenic sulfonate marketed by Sonneborn Chemical & Refining Co.), active sulfonate=62.0%, mineral oil=32.5%, water=5.0%, and salt impurities=0.5%.
CR=Petronate CR (a sodium alkyl aryl naphthenic sulfonate marketed by Sonneborn Chemical & Refining Co.), active sulfonate=62.0%, mineral oil=32.5%, water=5.0% and salt impurities=0.5%.

EXAMPLE 2

Micellar solution prestocks are prepared by mixing 85% of stabilized light straight-run gasoline and 15% of petroleum sulfonate having an average equivalent weight indicated in Table II. The sulfonates are obtained by blending appropriate weight amount of Petronate CR and Petronate L (a sodium alkyl aryl naphthenic sulfonate marketed by Sonneborn Chemical & Refining Co. having an analysis similar to Petronate CR). Twenty five mls. of the prestock is placed in a 50 mls. graduated cylinder and 25 mls. of brine (NaCl and distilled water) containing the below-indicated amounts of sodium chloride are added and the mixture shaken. The mixture is allowed to set until a constant phase separation is obtained and the mls. of brine uptake in the prestock is observed. Table II contains the mls. of brine uptake:

TABLE II

| Sample | Average equivalent weight of sulfonate in micellar solution prestock | Brine uptake | |
|---|---|---|---|
| | | P.p.m. of NaCl in brine | Mls. of brine uptake |
| 1a | 500 | 100,000 | 1.0 |
| 1b | 480 | 100,000 | 2.1 |
| 1c | 465 | 100,000 | 1.8 |
| 1d | 440 | 100,000 | 3.1 |
| 1e | 422 | 100,000 | 3.5 |
| 2a | 500 | 50,000 | 1.8 |
| 2b | 465 | 50,000 | 3.0 |
| 2c | 440 | 50,000 | 4.0 |
| 2d | 422 | 50,000 | 18.0 |
| 3a | 500 | 30,000 | 2.5 |
| 3b | 480 | 30,000 | 3.0 |
| 3c | 465 | 30,000 | 4.0 |
| 4a | 500 | 10,000 | 4.5 |
| 4b | 480 | 10,000 | 5.2 |
| 4c | 465 | 10,000 | 7.5 |
| 4d | 440 | 10,000 | 16.0 |
| 5a | 500 | 5,000 | 6.0 |
| 5b | 480 | 5,000 | 8.0 |
| 5c | 465 | 5,000 | 12.0 |
| 6a | 500 | 1,000 | 15.0 |
| 6b | 480 | 1,000 | 16.4 |
| 6c | 465 | 1,000 | 19.0 |

From these data in Table II, it is observed that the lower equivalent weight sulfonates have a higher brine tolerance.

What is claimed is:

1. In a method of preparing a micellar solution of a desired brine tolerance comprising mixing hydrocarbon, water and surfactant sufficient to impart micellar solution characteristics to a mixture of the hydrocarbon and the water, the improvement comprising further incorporating a petroleum sulfonate having a lower average equivalent weight than the surfactant to obtain a high brine tolerance or incorporating a petroleum sulfonate having a higher average equivalent weight than the surfactant to obtain a low brine tolerance, the average equivalent weight ranges of the lower and the higher average equivalent weight sulfonates being within the range of about 350 to about 525.

2. The method of claim 1 wherein the micellar solution is comprised of a hydrocarbon, water, surfactant, electrolyte which can be an inorganic salt, inorganic base or inorganic acid, and a semi-polar organic compound which can be a ketone, ester, amide, or alcohol containing one to about 20 or more carbon atoms.

3. The method of claim 1 wherein the surfactant is a petroleum sulfonate having an average equivalent weight within the range of about 350 to about 525.

4. In a method of preparing a micellar solution comprising mixing hydrocarbon, water, petroleum sulfonate having an average equivalent weight within the range of 350 to about 520, electrolyte which is inorganic salt, inorganic acid, or inorganic base, and a semi-polar organic compound which is a ketone, ester, amide, or alcohol containing 1 to about 20 carbon atoms, the improvement comprising further admixing a petroleum sulfonate having a lower average equivalent weight than the originally present petroleum sulfonate to obtain a high brine tolerance or admixing a higher average equivalent weight petroleum sulfonate than the originally present petroleum sulfonate to obtain a decreased brine tolerance, the lower and higher average equivalent weight petroleum sulfonates having an average equivalent weight within the range of about 350 to about 525.

5. The method of claim 4 wherein the average equivalent weight of the admixed petroleum sulfonate is within the range of about 400 to about 500.

6. The method of claim 4 wherein the semi-polar organic compound is an alcohol.

7. The method of claim 6 wherein the electrolyte is an inorganic salt.

References Cited
UNITED STATES PATENTS

| 2,328,727 | 9/1943 | Langer | 252—49.5 |
| 2,338,522 | 1/1944 | Liberthson | 252—49.5 |
| 2,563,588 | 8/1951 | Dixon | 252—49.5 |

JOHN D. WELSH, Primary Examiner

U.S. Cl. X.R.
252—49.5 308